Feb. 21, 1933.                A. L. HARPER                1,898,625
                            BRAKE CONTROL MEANS
                    Filed Nov. 25, 1929        2 Sheets-Sheet 1

INVENTOR.
Arthur L. Harper.
BY
ATTORNEY.

Feb. 21, 1933.    A. L. HARPER    1,898,625
BRAKE CONTROL MEANS
Filed Nov. 25, 1929   2 Sheets-Sheet 2

INVENTOR.
Arthur L. Harper.
BY
ATTORNEY.

Patented Feb. 21, 1933

1,898,625

UNITED STATES PATENT OFFICE

ARTHUR L. HARPER, OF ALTADENA, CALIFORNIA

BRAKE CONTROL MEANS

Application filed November 25, 1929. Serial No. 409,731.

This invention relates more particularly to a safety device for brakes used on well-drilling equipment.

Within the last few years oil wells have greatly increased in depth, and much heavier drill pipe and casing have also recently come into general use in oil producing sections. As a result there has been a correspondingly great increase in the amount of weight to be handled by oil well drilling equipment, making it very hazardous for a small man, and hard work for any man, to operate the rotary brake in common use as a part of oil well drilling equipment. Every year many men are injured and a considerable number killed by what is known as "brake kicking" which is generally the result of a clutch being thrown in to pick up heavy drill pipe or casing, the weight of which is still being sustained by the brake.

An object of this invention is to overcome the aforementioned hazards and to make it safer and easier to operate equipment to which the invention is applied.

Another object is to provide a device for the purpose stated, which may readily be attached at a comparatively small expense, to well drilling equipment now on the market.

Still another object of the invention is to so adapt the device to well drilling apparatus now on the market as to render it unnecessary to make any change in the present method of operation, or requisite to re-educate workmen in any way, to enable them to properly use the invention. No additional operating levers or new manually operable parts are required.

The invention comprises an attachment for present well drilling equipment that may be manufactured at a relatively low cost, easily and quickly installed and which is very durable and dependable in its operation.

A feature of the invention is that it may be easily and quickly adjusted to provide the desired amount of additional braking power to adapt the device to the individual requirements in the field.

Another feature of the invention is that greater weights may be sustained upon the traveling blocks with fewer lines strung when the device is equipped with my invention; thereby increasing speed of drilling operation with maximum safety.

Other objects, advantages, and features of invention may appear from the accompanying drawings, the subjoined detail description and the appended claims.

The accompanying drawings illustrate what is at present deemed to be a preferred embodiment of the invention.

Figure 1:
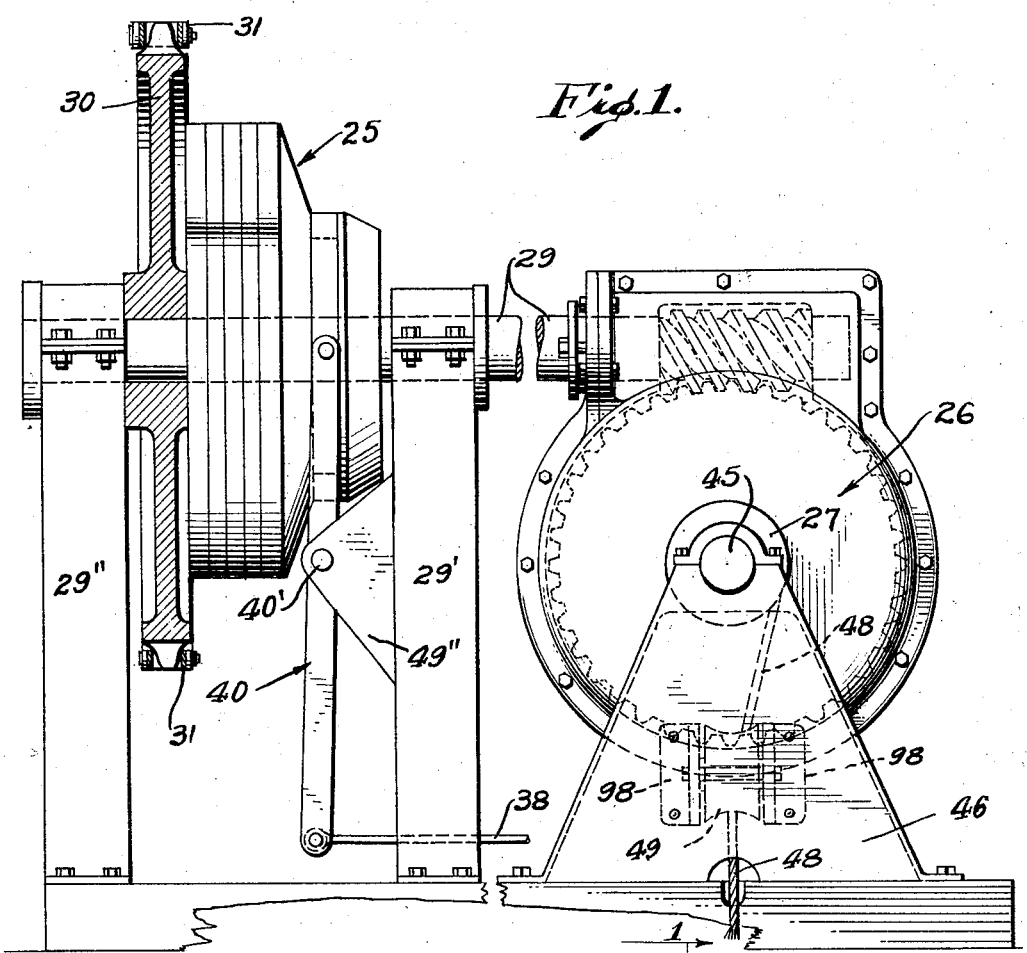
Figure 1 is a cross section on irregular line 1—1, Fig. 2, illustrating only parts provided by the invention, parts being broken away to contract the view.
Figure 2:
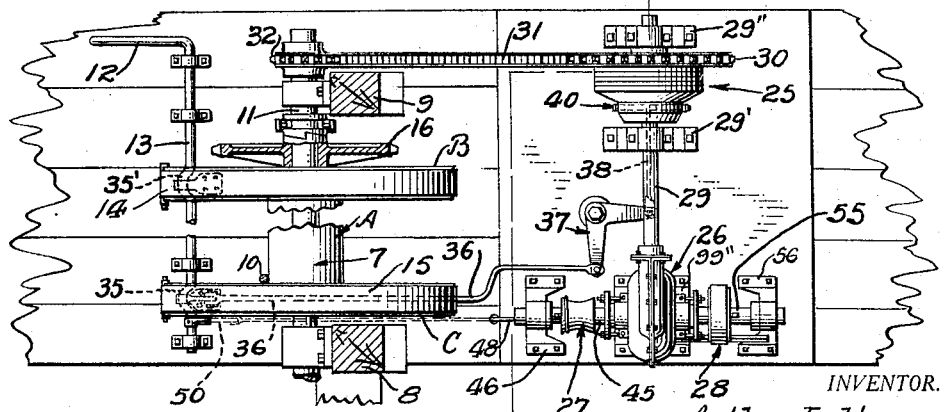
Fig. 2 is a plan view of a rotary drum mechanism showing my invention applied thereto, parts being broken away to contract the view, size of parts pertaining to the invention being greatly exaggerated with relation to well known parts in connection with which they are used, for clearness of illustration.

Referring in detail to the drawings, in Fig. 2 is seen in plan the well known rotary main drum 7 which is supported by and between jack posts 8 and 9 and which operates the casing line 10, (see Fig. 3) that is wound upon hub A, said drum 7 being fixed to a shaft 11. The brake lever 12 is secured to or formed as a part of the brake shaft 13 which operates the brake bands 14 and 15 which engage wheels B and C. To shaft 11 is fixed the usual drawing sprocket wheel 16.

The above parts pertain to well known well drilling equipment.

Referring now to the construction of parts forming my invention, in combination therewith, the four main working units are the clutch 25, together with the parts co-operating therewith, the worm drive differential 26, the auxiliary line drum 27 and the auxiliary braking device 28.

Clutch 25 co-operates with a shaft 29 upon which is loosely mounted a sprocket wheel 30, and said clutch connects and disconnects said shaft and sprocket wheel. Said sprocket wheel 30 is driven by a chain 31 from a smaller sprocket wheel 32 which is fixedly connected or attached to the main drum shaft 11. Said shaft 29 is supported at one end by bearing standards 29' and 29" and between which the clutch 25 is mounted.

Main brake shaft 13 has crank portions 35, 35' which serve to form an operating means for the brake bands 14, 15 and the crank 35 also serves to operate the clutch rod 36 which leads to one arm of a bell crank 37, the other arm of said bell crank being pivoted to one end of a clutch-operating link 38 which is pivotally connected at its other end with the lower extremity of the bifurcated clutch arm 40 that is pivotally supported at 40' from a bracket 49" carried by standard 29'.

The auxiliary line drum 27 is connected with the differential 26 by means of a shaft 45, the outer end of said shaft 45 being supported by a standard 46. To said line drum 27 is fastened one end of a line 48, said line being led around an idling pulley 49 mounted on brackets 98, and thence to the lower end of an arm 50 which projects radially below and is rigidly secured in any suitable manner to the main brake shaft 13.

Figure 3:
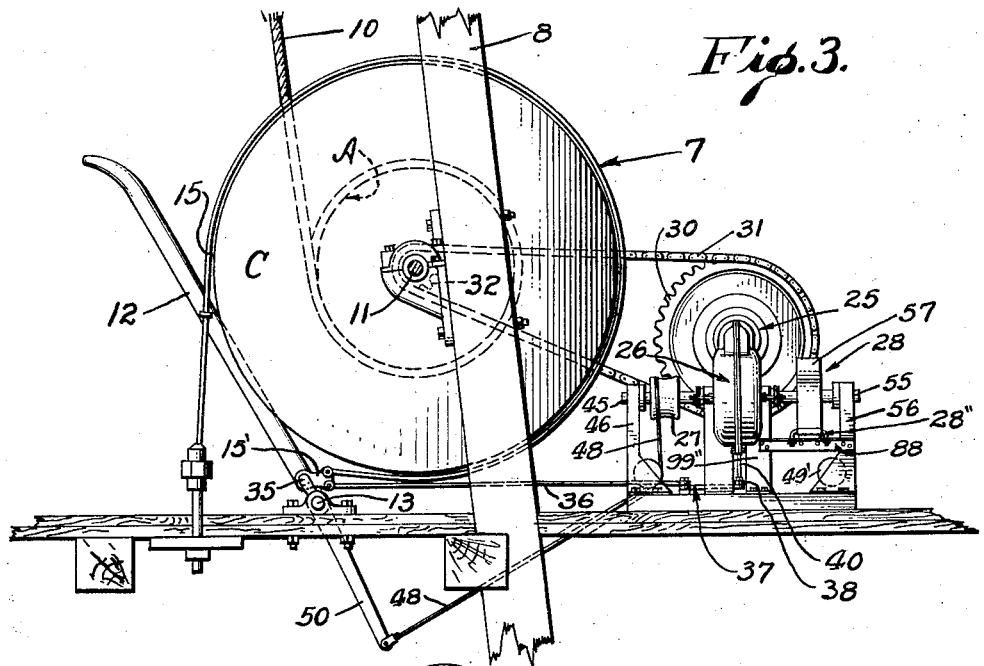
Fig. 3 is a side elevation as viewed looking at the lower side of the apparatus shown in plan in Fig. 2.
Figure 4:
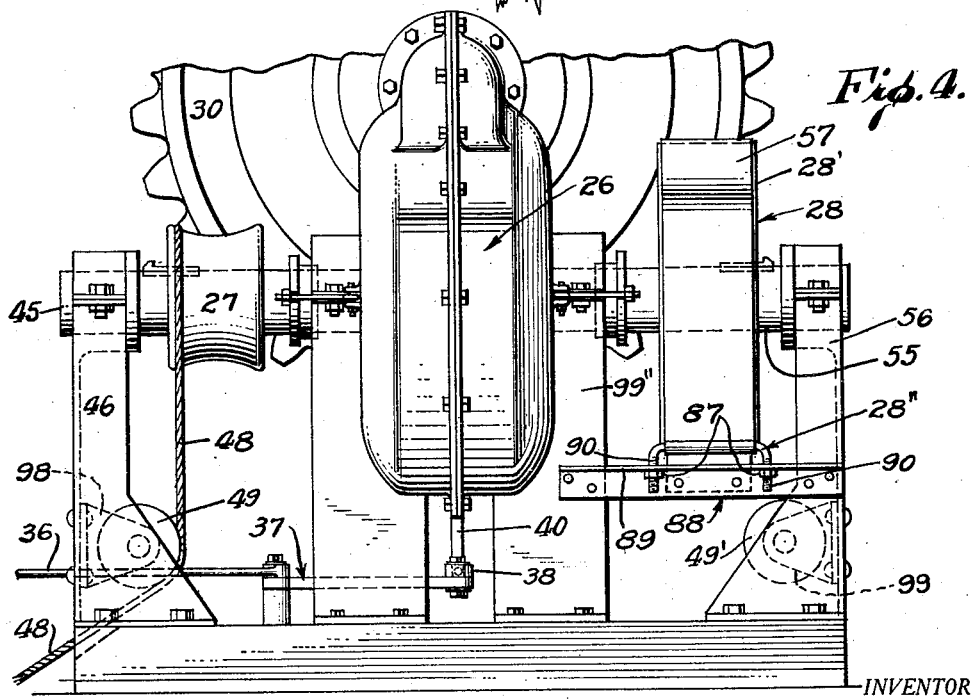
Fig. 4 is a reproduction on an enlarged scale of the right hand portion of Fig. 3, the upper portion of the view being broken away to contract the same.

In Fig. 3 is shown the preferred means for connecting the main brake band 15 and rod 36 with the main brake shaft 13. For this purpose a small plate or casting 15' is pivotally mounted upon the crank portion 35 of shaft 13, and said band 15 and rod 36 are both pivotally secured to said part 15'.

The auxiliary brake device 28 includes a drum 28' fixed to the auxiliary shaft 55, one end of which enters the differential 26 and the other end of which is supported by the standard 56. Said brake drum 28' is encircled by an adjustable brake band 57 which is kept sufficiently tight to cause line drum 27 to do the required amount of work.

Adjustment of brake band 57 on the auxiliary brake drum 28' may be secured by attaching to one end of said brake band the U-bolt 28" having screw threaded limbs 90 which extend through the flange 89 of an angle iron bracket 88 fixed to the standards 56, 99" in any suitable manner. Said limbs are provided with adjustable nuts 87 to vary the tension of the brake band 57.

In operation, power from the rotary drum shaft 11 is made use of and brought to bear upon the main brake bands 14 and 15. This is accomplished by reason of power being automatically applied to the downwardly extending arm 50 through line 48 when said line is wound upon auxiliary line drum 27. The surplus power is absorbed by the auxiliary braking device 28 until the main brake drum 7 ceases to rotate.

When the main brake is applied by depressing lever 12, the rod 36, through the bell crank 37, link 38 and yoke 40, operates the clutch 25 causing power to be transmitted from sprocket wheel 32 on shaft 11, through chain 31 and sprocket wheel 30 to the differential 26. This in turn, starts drum 27 rotating until the slack in the line 48 secured to the lower end of arm 50, and which resulted from depressing lever 12, is taken up. Then arm 50 begins to be subjected to a strain which adds to and maintains the braking effect applied to main drum 7. After the slack is thus taken out of line 48 and additional braking power secured as just stated, drum or pulley 27 ceases to revolve, and drum 28' turns within its brake band 57 until the main braking drum 7 is stopped. The take-up of slack in line 48 and application of additional pull upon shaft 13 is practically instantaneous.

The force of any "kick", such as might cause a dangerous upward jerk of the manually operable brake lever 12, is practically eliminated or checked because drum 27 must be set in motion through line 48 before brake lever 12 can rise.

When an oil rig is provided wherein it would be more convenient to mount the sprocket wheel 32 on the opposite side of shaft 11 than that shown in Fig. 3, the parts comprising my invention as shown are turned end for end, and in that position the line 48 is trained over pulley 49' mounted in bearing brackets 99 supported by and extending inwardly from the standard 56. In this position the line drum 27 and the auxiliary braking device 28 are interchanged, as will be apparent to those skilled in the art.

I claim:

1. In well drilling equipment, the combination with the main drum, its casing line, clutch for causing said main drum to operate said line, and manually operable control brake for said main drum; of means to add automatically to the braking force of said control brake when the latter is manually operated.

2. In well drilling equipment, the combination with the main drum, its casing line, clutch for causing said main drum to operate said line, and manually operable control brake for said main drum; of means to add automatically to the braking force of said control brake when the latter is manually operated, said means comprising a differential operatively connected with said main drum.

3. In well drilling equipment, the combination with the main drum, its casing line, clutch for causing said main drum to operate said line, and manually operable control brake for said main drum; of a rotatable member to add automatically to the braking force of said control brake when the latter is manually operated, and a co-operating differential and braking device to govern the amount of braking force added by said rotatable member, said differential being operatively connected with said main drum.

4. In well drilling equipment, the combination, with a main drum, its casing line, clutch for causing said main drum to operate said line, and brake to control said main drum; of an auxiliary regulatable brake drum, and auxiliary line drum, a differential to control the relative rotation of said two auxiliary drums, means operatively connecting said differential with said main drum, and a line operatively connecting said auxiliary line drum and said manually operable brake, to add to the braking force of said manually operable brake.

5. In well drilling equipment, the combination, with a main drum, its casing line, clutch for causing said main drum to operate said line, and brake to control said main drum; of an auxiliary braking device, an auxiliary line drum, a differential operatively connecting said auxiliary braking device and auxiliary line drum, means operatively connecting said differential with said main drum, and an operative connection between said auxiliary line drum and said manually operable brake to add automatically to the braking force of said manually operable brake.

6. In well drilling equipment, the combination, with a main drum, its casing line, means whereby said drum operates said line, and a main brake for said drum comprising a main brake shaft and means to rock said brake shaft; of an auxiliary braking device comprising an auxiliary line drum, a differential operatively connecting said auxiliary braking device with said auxiliary line drum, means operatively connecting said differential with said main drum, and a line having a radial connection operable by said main brake shaft and operable by said auxiliary line drum to add automatically to the force with which said main brake is applied.

7. An auxiliary braking device comprising a differential including shafts extending therefrom; an auxiliary brake drum fixed to one of said shafts; means to apply braking power to said drum; an auxiliary drum fixed to another of said shafts; means to drive said differential; and means connected to said auxiliary drum and adapted to apply braking effect to said differential driving means.

8. The combination of a rotary shaft; means to apply braking power to said shaft; differential shafts connected to be rotated by said rotary shaft; and means whereby additional braking power is applied to said rotary shaft when braking power is applied thereto.

9. The combination of a rotary shaft; means to apply braking power to said shaft; differential shafts connected to be driven by said rotary shaft; a clutch interposed between said rotary shaft and differential shaft driving connection; means to apply a predetermined braking pressure to one of said differential shafts; and means connected to the other of said differential shafts and to the means for applying braking power to said rotary shaft whereby when said clutch is operated to drive said differential shafts additional braking power is applied to said rotary shaft.

10. An auxiliary braking device for a driving shaft having a brake drum and a brake associated with said driving shaft; means for operating said brake; and means operated by said brake operating means to apply additional braking power to said brake operated means from said driving shaft.

11. The combination of a rotary shaft; means to apply a braking power to said shaft; and means whereby additional braking power is applied automatically to said rotary shaft when braking power is applied thereto.

12. The combination of a rotary shaft; means to apply braking power to said shaft including a brake lever; a shaft driven by said rotary shaft; a clutch on said driven shaft; said clutch being operated by said brake lever; and means operated by said driven shaft to apply additional leverage to the said brake lever to increase the braking power applied to said rotary shaft.

In testimony whereof, I have hereunto set my hand at Los Angeles, California, this 12th day of November, 1929.

ARTHUR L. HARPER.